United States Patent
Cox et al.

(10) Patent No.: US 7,047,019 B1
(45) Date of Patent: May 16, 2006

(54) METHOD AND APPARATUS FOR PROCESSING A COMMUNICATION SIGNAL BASED ON THE GEOGRAPHICAL LOCATION OF A COMMUNICATION DEVICE

(75) Inventors: Gregory W. Cox, Schaumburg, IL (US); Stephen S. Gilbert, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/579,746

(22) Filed: May 26, 2000

(51) Int. Cl.
*H04Q 7/20* (2006.01)

(52) U.S. Cl. .................. 455/456.1; 455/456.2; 455/457

(58) Field of Classification Search ............. 455/414, 455/417, 415, 456.1, 422, 433, 456.2
See application file for complete search history.

(56) References Cited

U.S. PATENT DOCUMENTS

| | | | | |
|---|---|---|---|---|
| 5,758,264 A | * | 5/1998 | Bonta et al. | 455/445 |
| 5,796,365 A | * | 8/1998 | Lewis | 342/357 |
| 5,802,160 A | * | 9/1998 | Kugell et al. | 379/211 |
| 5,901,211 A | * | 5/1999 | Dean et al. | 379/211 |
| 5,913,168 A | * | 6/1999 | Moreau et al. | 455/441 |
| 6,038,451 A | * | 3/2000 | Syed et al. | 455/445 |
| 6,067,529 A | * | 5/2000 | Ray et al. | 705/26 |
| 6,246,958 B1 | * | 6/2001 | Hirono | 701/208 |
| 6,285,683 B1 | * | 9/2001 | Lin | 370/466 |
| 6,363,248 B1 | * | 3/2002 | Silverman | 455/417 |
| 6,397,058 B1 | * | 5/2002 | Thibert et al. | 455/414 |
| 6,430,409 B1 | * | 8/2002 | Rossmann | 455/422 |
| 6,490,449 B1 | * | 12/2002 | Thibert et al. | 455/433 |
| 6,496,578 B1 | * | 12/2002 | Chen et al. | 379/211.02 |
| 6,556,831 B1 | * | 4/2003 | Buppelmann | 455/403 |
| 6,584,316 B1 | * | 6/2003 | Akhteruzzaman et al. | 455/445 |

* cited by examiner

*Primary Examiner*—William Trost
*Assistant Examiner*—Danh Le
(74) *Attorney, Agent, or Firm*—Jeffrey K. Jacobs

(57) ABSTRACT

An apparatus including a processor 42 coupled to a memory 44 resides in a location call filtering center 36 and cooperates with a gateway mobile location center 34 and a mobile switching center 22 to process a communication signal, based on the geographical location of a communication device 28, such as a mobile telephone. The processor 42 accesses a user location filter database 46 stored in the memory 44 which contains a set of subscriber conditions/preferences that may be used to identify a processing operation to be performed on the call. The processor 42 further operates as an Internet web page server to afford mobile subscribers Internet 56 access to the user location filter database 46 so that the mobile subscribers may enter and/or edit the set of conditions/preferences stored in the memory 44.

46 Claims, 3 Drawing Sheets

METHOD AND APPARATUS FOR PROCESSING A COMMUNICATION SIGNAL BASED ON THE GEOGRAPHICAL LOCATION OF A COMMUNICATION DEVICE

FIELD OF THE INVENTION

The present invention relates generally to communications systems, and more specifically, to a method for processing communication signals based on the geographical location of a communication device.

BACKGROUND OF THE INVENTION

Due to the explosion of growth in the communication and information industries, people are able to access more information in more ways than ever before. Moreover, communication devices such as telephones, fax machines, pagers, personal digital assistants, and a myriad of Internet accessing devices are increasingly becoming more easily portable thereby allowing the consuming public to remain "plugged-in" or "connected" to the vast array of information regardless of where they travel and regardless of the time of day. Though most would agree that this increased access to information has benefited both the business sector and the consuming public, there is a growing concern about information overload. Information overload, as discussed in "Beat Information Overload," an article published in the February 1997 issue of PC World, refers to a phenomenon in which the consumer finds himself inundated with information. More particularly, the consumer becomes overloaded because he must filter through all of the incoming information and decide which he will absorb and respond to and which he will not. Because he is forced to spend more and more time each day coping with mass amounts of incoming information, the consumer experiences lower efficiency and productivity. The increasingly portable nature of communication devices further compounds the problems associated with information overload because the consumer finds himself unable to escape the incoming information.

Cellular telephones provide a good example of the potentially disruptive effect of uncontrolled incoming information. Specifically, cellular telephones are often carried on the person of the subscriber throughout the day. As a result, there is a greater likelihood that an incoming call will occur at a time when the subscriber is otherwise occupied such as, for example, while the subscriber is in a business meeting or driving a car. Moreover, a ringing telephone requires immediate attention whereas other forms of communication may be handled at the convenience of the recipient.

Presently, there are a limited number of communication systems that give the consumer at least some amount of control over incoming information. For example, one of the presently available systems, known as call forwarding, allows a cellular user to automatically send all calls addressed to a different telephone to his cellular phone, or vice versa. Another system, known as caller ID, enables a user to automatically screen calls from a particular caller or a group of callers. More specifically, using caller ID, a cellular telephone user may program his cellular phone to ring, or not ring depending on his preference, when calls from a particular number are received. Yet another system, referred to as Wildfire Electronic Assistant®, is a digital answering service by which a user may control which phone calls are received and which are forwarded to voicemail.

Although these systems provide the consumer some amount of control over incoming information, all are limited in that none afford the consumer control over information received at a communication device based on the geographical location of the communication device. For example, none of the systems automatically filter incoming information, such as a telephone call, based on the location of the recipient's portable telephone or based on the location of any other communication device. As a result, cellular telephone subscribers and other communication system subscribers receive telephone calls and information regardless of where they may be located and regardless of the inconvenience that may be attendant to receiving such information at such a location.

Thus, there is a need for a method and apparatus that provides location-based communication processing wherein the processing of a communication signal is based on the geographical location of a communication device.

DESCRIPTION OF THE PREFERRED EMBODIMENT

The present invention is directed to a method and apparatus for location-based communication signal processing wherein the processing of a communication signal is based, at least in part, on the geographical location of a communication device. In one embodiment, a location-based call filtering apparatus enables forwarding of a cellular telephone call based on the geographical location of a cellular telephone subscriber unit. More particularly, a location call filtering center is coupled to a mobile switching center and enables the identification of a target communication device to which a call shall be forwarded based on the geographical location of the subscriber unit.

Figure 1:
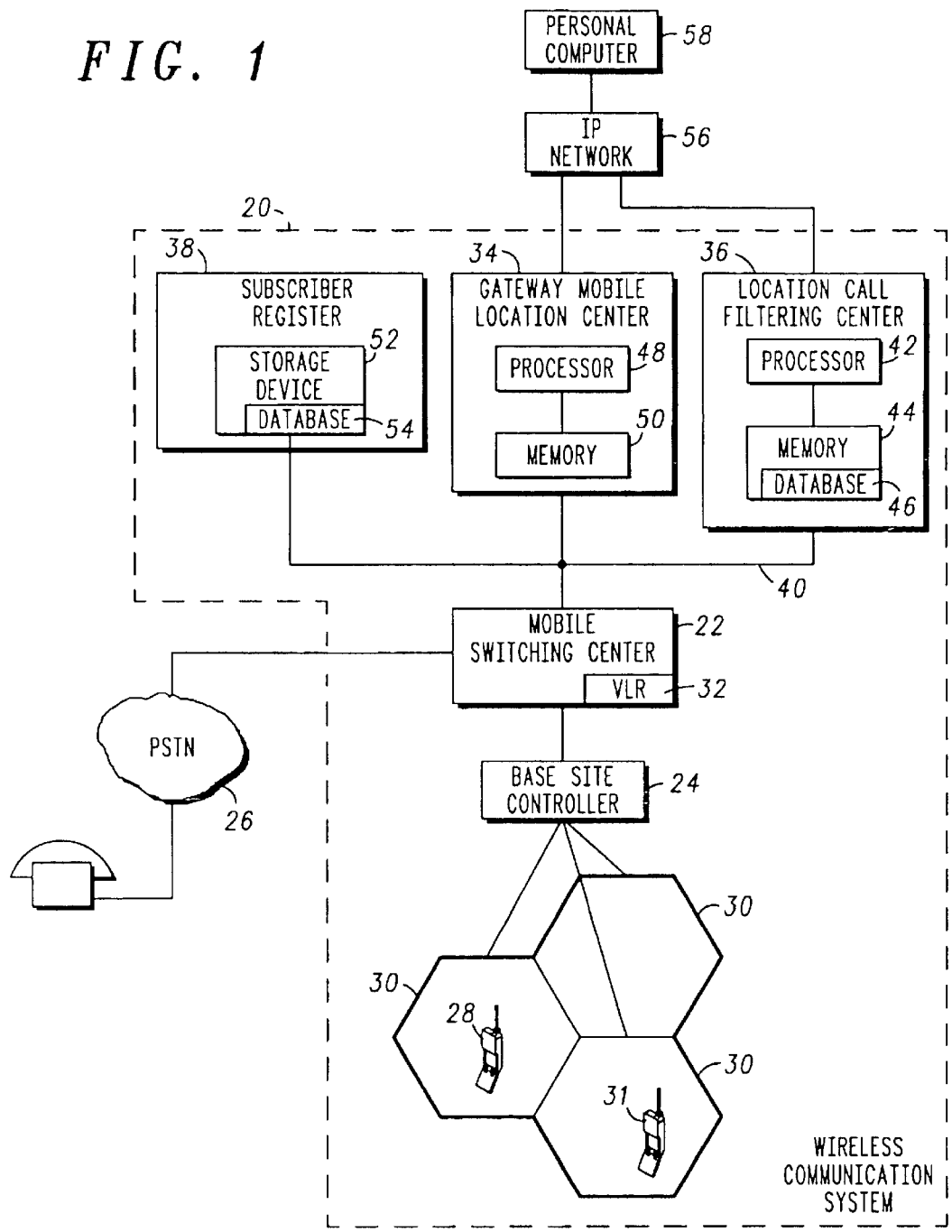
FIG. 1 is a block diagram of a communication system equipped to perform location-based communication signal processing in accordance with one aspect of the present invention.

Referring now to FIG. 1, a wireless communication system 20 having a mobile switching center (MSC) 22 and a base site controller (BSC) 24 is connected to a public switched telephone network (PSTN) 26. As will be understood by one of ordinary skill in the art, although FIG. 1 depicts a single MSC 22 coupled to a single BSC 24, conventional wireless communication systems typically include a plurality of MSCs that provide service to a plurality of BSCs. The MSC 22, in conjunction with the BSC 24, provides wireless telephone service to one or more communication devices, such as wireless telephone system subscriber units 28, that are located within a plurality of geographical zones referred to as cell sites 30. To provide wireless telephone service, the MSC 22 and the BSC 24 are equipped with conventional telephone switching and telephone call processing systems that operate in accordance with the Global Standard for Mobile Communications (GSM) and that are well known in the art of wireless telephony.

Although the present invention, as depicted in FIG. 1, may be embodied in a wireless telephone communication system, it should be understood by one of ordinary skill in the art that the present invention instead may be implemented in any communication system wherein communication signals are processed. Such a communication system may comprise, for example, a circuit-mode communication system, a packet-switched communication system, a connectionless communication system, a paging communication system or a short messaging communication system. Moreover, a communication signal is defined to include a set of one or more signals bearing information to be communicated. Thus, for example, a telephone call, a short message, and/or a page generated by a paging device all qualify as communication signals as defined herein. In addition, the communication signal is not limited to a particular type of signal format such as a voice signal format but may also include a digital or analog data signal format or a video and/or audio signal format.

Generally, the method by which the MSC 22 and the BSC 24 process an incoming communication signal, such as a telephone call, may include the steps of receiving the incoming telephone call from the PSTN 26 or from a mobile subscriber unit 28 located within one of the cell sites 30 and then forwarding the call to an appropriate destination which may include one of a plurality of target communication devices 31. Although the target communication device 31 shown in FIG. 1 is represented by a cellular telephone subscriber unit, the target communication device 31 may be any of a plurality of communication devices such as, for example, a land-based telephone, a voicemail program, or a paging device. The step of forwarding the call to the appropriate target communication device 31 further may include the step of consulting a visitor location register 32 disposed in the MSC 22. The visitor location register 32 is a fast-access, volatile database of mobile subscriber units 28 that are currently active in the cell sites 30 serviced by the MSC 22 and the BSC 24. Thus, assuming that the phone call is addressed to the mobile subscriber unit 28, the visitor location register 32 is consulted to determine whether the mobile subscriber unit 28 is presently located in any of the cell sites 30 serviced by the MSC 22 and the BSC 24.

To enable the provision of a location-based call filtering service, the MSC 22 is coupled to a gateway mobile location center (GMLC) 34, a location call filtering center 36 and an authorized subscriber register 38 via an internal network 40. The location call filtering center 36 includes a processor 42 coupled to a memory 44 in which a user location filter database 46 is stored. The processor 42 is programmed to execute a location-based call filtering routine wherein the processor 42 accesses the user location filter database 46 to identify to which of a list of candidate target devices 31 an incoming call is to be forwarded. The processor 42 may be implemented using any programmable processing device, such as, for example, a personal computer that runs a Linux® or Microsoft Windows NT® operating system, or a Sun® Unix work station that runs a Solaris® operating system. The user location filter database 46 accessed during the location-based call filtering routine includes a list of all of the mobile subscriber units 28 that are authorized to receive a location-based call filtering service. In addition, the database 46 includes a set of conditions or preferences for each listed subscriber unit 28. The set of conditions or preferences are used by the processor 42 to identify one of a set of candidate target communication devices 31 to which an incoming call is to be sent, wherein the target communication device 31 that is selected is based, at least in part, on the geographical location of a communication device, hereinafter referred to as a primary communication device.

For illustrative purposes only, the mobile subscriber unit 28 to which the call being processed is addressed is hereinafter defined as the primary communication device. In operation, the primary communication device need not be the same as, or even associated with, the mobile subscriber unit 28 for which the call is addressed.

The GMLC 34 determines the geographical location of the mobile subscriber unit 28 and is equipped with a processor 48 coupled to a memory 50. The processor 48 may be implemented using any programmable processing device, such as, for example, a personal computer that runs a Linux® or Microsoft Windows NT® operating system, or a Sun® Unix work station that runs a Solaris® operating system. It should be noted that "gateway mobile location center" is a term of art that refers to a device that identifies the location of mobile subscriber units within a wireless communication system in accordance with a newly proposed addition to the Global Standard for Mobile Communications (GSM) that has been proposed to accommodate location-based services such as E911 and location-based advertising services. As such, the process by which the GMLC 34 performs location identification is not discussed further herein. For additional information concerning the location identification process and the equipment disposed within a conventional gateway mobile location center, the reader is referred to GSM proposed Standard No. T1P1.5/GSM 03.71. It should further be noted that the algorithm by which the GMLC 34 identifies the location of the mobile subscriber unit 28 may include any of the presently known and future methods available for location determination in a wireless communication environment, and is not intended to be limited solely to those methods or algorithms proposed in the aforementioned GSM standard.

The authorized subscriber register 38 includes a data storage device 52 within which an authorized subscriber database 54 is stored. The authorized subscriber database 54 includes a list of all mobile subscriber units 28 that are currently authorized to receive the wireless communication service provided by the wireless communication system 20. When an incoming call is being processed by the MSC 22, the MSC 22 consults the authorized subscriber database 54 to determine whether the subscriber unit 28 to which the incoming call is addressed is listed therein. If so, the MSC 22 proceeds to process the call in accordance with a standard call processing routine. Otherwise, the MSC 22 delivers an appropriate error message such as a fast busy signal or a recorded message that may state, for example, that the telephone number dialed is not in service. To enable location-based call filtering, the authorized subscriber database 54 may further indicate whether each of the authorized subscriber units 28 listed therein have subscribed to the location-based call filtering service. This may be indicated by, for example, setting a service flag associated with each listed subscriber that wishes to receive the service.

The internal network 40 by which the MSC 22 communicates with the authorized subscriber register 38, the GMLC 34 and the location call filtering center 36 may be implemented with a standard telephony signaling system no. 7 (SS7) network as is typically used in accordance with the GSM and other such conventional telephone systems. As is conventional, this internal SS7 network may also be coupled to a plurality of wireless communication service providers [not shown] to enable communication therebetween.

To provide mobile subscribers with access to the user location filter database 46, the location call filtering center 36 is further coupled to an Internet protocol network, such as the Internet 56. Preferably, although not necessarily, the processor 42 disposed in the location call filtering center 36 is further programmed to operate as a web page server that supports a web page by which the mobile subscriber, operating a personal computer 58, may establish/edit a set of conditions or preferences that will dictate to which of a set of candidate target communication devices 31 a call is to be forwarded based on the geographical location of the primary communication device. The primary communication device, which is designated as such by the subscriber, may comprise any of a plurality of communication devices including, for example, a cellular telephone, a land based telephone or a pager and is specified in the set of conditions/preferences as the device upon which the performance of a call processing operation will be based. The set of conditions/preferences need not be limited to specifying a target communication device to which a call is to be forwarded but may instead specify that any of a plurality of call processing operations are to be performed based on the geographical location of the primary communication device. For example, instead of forwarding the call, the processing operation specified may comprise terminating the call, or may comprise altering the protocol in which the call is transmitted. Moreover, as stated hereinbefore, because the present invention may be implemented to operate with any number of communication systems, the communication signal that is processed based on the geographical location of a primary communication device is not limited to a telephonic communication signal, such as a telephone call, but may instead comprise any communication signal.

The web page may provide access to a form having a set of data fields into which data is entered wherein the entered data is later stored in the user location filter database 46 and used by the processor 42 so that incoming calls may be forwarded according to the mobile subscriber's preferences. For example, the form may include a data field entitled "Region 1." Within the field, Region 1, the user may be prompted to enter a set of longitudinal and latitudinal coordinates that define the boundaries of a first geographical region. Alternatively, the form may include a box associated with the field, Region 1, wherein checking the box causes the web page server to display a geographical map on which the user may select a geographical area that defines the boundaries of the first geographical region, Region 1. Such a selection may be made, for example, by highlighting a portion of the screen on which the map is displayed using a mouse or the up and down arrows of a keypad and then selecting the highlighted area. The web page server may then translate the selected area to a set of coordinates that define the boundaries of the first geographical region, Region 1. The web page form may further include a field entitled "Target 1" into which the mobile subscriber will be prompted to enter a preferred target communication device to which any calls made to the subscriber unit 28 are to be forwarded, while the subscriber unit 28 is located in the Region 1. Preferably, although not necessarily, the web page form further includes a set of fields by which the user may specify additional conditions that affect the target communication device 31 to which an incoming call is transferred while the subscriber unit is located in Region 1. For example, additional conditions may include time of day, and a caller identification code that identifies the phone number of the source of the call, such that the target destination of an incoming call will depend not only upon the geographical region in which the subscriber unit is located, but also upon the time of day in which the call is received and the caller identification code associated with the call. As a further example, an additional condition may include data retrieved from the mobile subscriber's electronic calendar or personal digital assistant. Still further, the GMLC 34 may supply the speed at which the mobile subscriber unit 28 is traveling to the location call filtering center 36 and the set of conditions may include a range of speeds such that the location call filtering center 36 will identify the target communication device 31 based on the location of the mobile subscriber unit 28 in conjunction with the speed at which the mobile subscriber unit 28 is traveling.

Alternatively, the location call filtering center 36 may be equipped to support access to the user location filter database 46 via other methods/interfaces. For example, the data entry may be performed directly at the processor 42 located in the location call filtering center 36 by data entry personnel, provided, of course that the data entered is in accordance with the preferences specified by the mobile subscribers. Or, the location call filtering center 36 may be equipped to receive touch-tone (dual tone multi-frequency, DTMF) coded signals via telephone calls placed at mobile subscriber units 28 and forwarded through the MSC 22. This method may further include programming the mobile subscriber unit 28 to accept a set of commands by which the data may be entered. In addition, a web browser used to interface with the location call filtering center 36 need not be limited to those that are compatible with personal computers but may instead include web browsers that are associated with, for example, a device such as the mobile subscriber unit 28 or any other Internet compatible appliance.

Figure 2:
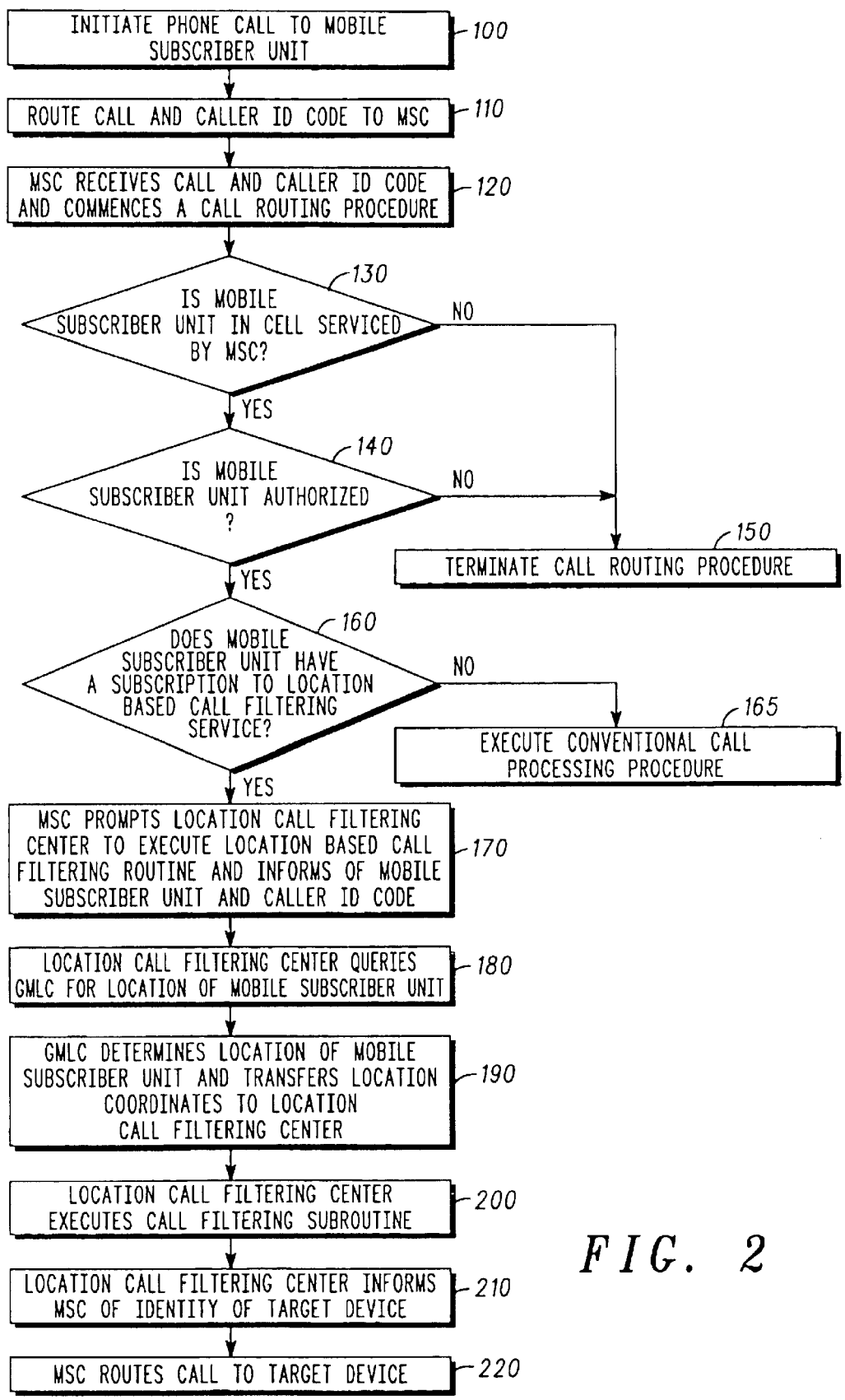
FIG. 2 is a flow chart that illustrates the steps of a method for performing location-based communication signal processing in accordance with another aspect of the present invention.

Referring now to FIG. 2, a method for identifying one or more of a plurality of candidate processing operations to be performed on a communication signal, wherein the target operation identified is based on the geographical location of a primary communication device begins at a block 100. For illustrative purposes, the processing operation to be performed involves forwarding the call to one of a plurality of candidate target communication devices wherein the identity of the selected target communication device is based on the geographical location of the primary communication device. However, as described hereinbefore, the candidate processing operations are not limited to forwarding the communication signal but may instead include any of a plurality of conventional processing operations. In addition, the geographical location of the primary communication device may not be determinable by the GMLC 34 such that the geographical location cannot be made available to the location call filtering center 36. In the event that the geographical location is not available to the location call filtering center 36, the location call filtering center 36 may be programmed to forward the call based on the information that the geographical location is not available as described further herein.

At the block 100 a phone call that is addressed to the mobile subscriber unit 28 is initiated at a phone 24 that is coupled to the PSTN 26, or at any other telephone or communication device coupled to the communication system 20. Next, at a block 110, the PSTN 26 forwards the call and a caller identification code that identifies the source of the call to the wireless communication system 20. Control then proceeds to a block 120 where the MSC 22 receives the call and the caller identification code from the PSTN 26 and begins a call forwarding procedure. Next, at a block 130, the MSC 22 checks the visitor location register 32 to determine whether the mobile subscriber unit 28 to which the call is addressed is located within one of the cell sites 30 serviced by the MSC 22. If the mobile subscriber unit 28 is so located, then control proceeds to a block 140. Otherwise, control proceeds to a block 150 where the MSC 22 terminates the call forwarding procedure. At the block 140, the MSC 22 checks the authorized subscriber database 54 to determine whether the mobile subscriber unit 28 is authorized to receive the mobile communication service provided by the mobile communication system 20. If the mobile subscriber unit 28 is authorized, then control passes to a block 160. If instead, the mobile subscriber unit 28 is not authorized, then control proceeds to the block 150 where the call forwarding procedure is terminated. At the block 160, the MSC 22 checks the authorized subscriber database to determine whether the mobile subscriber unit 28 has a subscription to the location-based call filtering service such that a located-based call filtering service should be enabled/executed. If the mobile subscriber unit 28 has the subscription, then controls passes to a block 170. Otherwise, control passes to a block 165 where the MSC executes a conventional call processing procedure in which the call is forwarded to the mobile subscriber unit 28 to which the call is addressed.

At the block 170, the MSC 22 prompts the location call filtering center 36 to execute the location-based call filtering routine and informs the location call filtering center 36 of the identity of the subscriber unit 28 to which the call is addressed and further informs the location call filtering center 36 of the caller identification code transmitted with the call. In response to the prompt from the MSC 22, at a block 180, the location call filtering center 36 checks the set of conditions/preferences associated with the mobile subscriber unit 28 to which the call is addressed to identify the communication device that the subscriber has specified as the primary communication device. The location call filtering center 36 thereafter sends a location query to the GMLC 34, wherein the location call filtering center 36 requests the geographical location of the primary communication device. Assuming, for example, that the subscriber has specified that the mobile subscriber unit 28 to which the call is addressed be defined as the primary communication device, the location call filtering center 36 requests the geographical location of the mobile subscriber unit 28. Also at the block 180, the location call filtering center 36 retrieves the set of conditions/preferences associated with the mobile subscriber unit 28 from the user location filter database 46. It is again noted that the set of preferences/conditions need not specify the mobile subscriber unit 28 to which the call is addressed as the primary communication device but may instead specify any of a plurality of communication devices as the primary communication device.

Next, at a block 190, the GMLC 34 responds to the query by determining the geographical location of the mobile subscriber unit 28 and by transmitting the coordinates of the geographical location of the mobile subscriber unit 28 to the location call filtering center 36. Upon receipt of the geographical location of the mobile subscriber unit 28, at a block 200, the location call filtering center 36 executes a call filtering subroutine in which the processor 42 tests each of the set of conditions/preferences established for the mobile subscriber unit 28 and that have been retrieved from the user location filter database 46 to determine a target communication device to which the call shall be forwarded. Once the target communication device is identified by the location call filtering center 36, the location call filtering center 36 informs the MSC 22 of the identity of the target communication device at a block 210. Lastly, at a block 220, the MSC 22 uses a conventional call forwarding procedure to forward the call to the target communication device.

Figure 3:
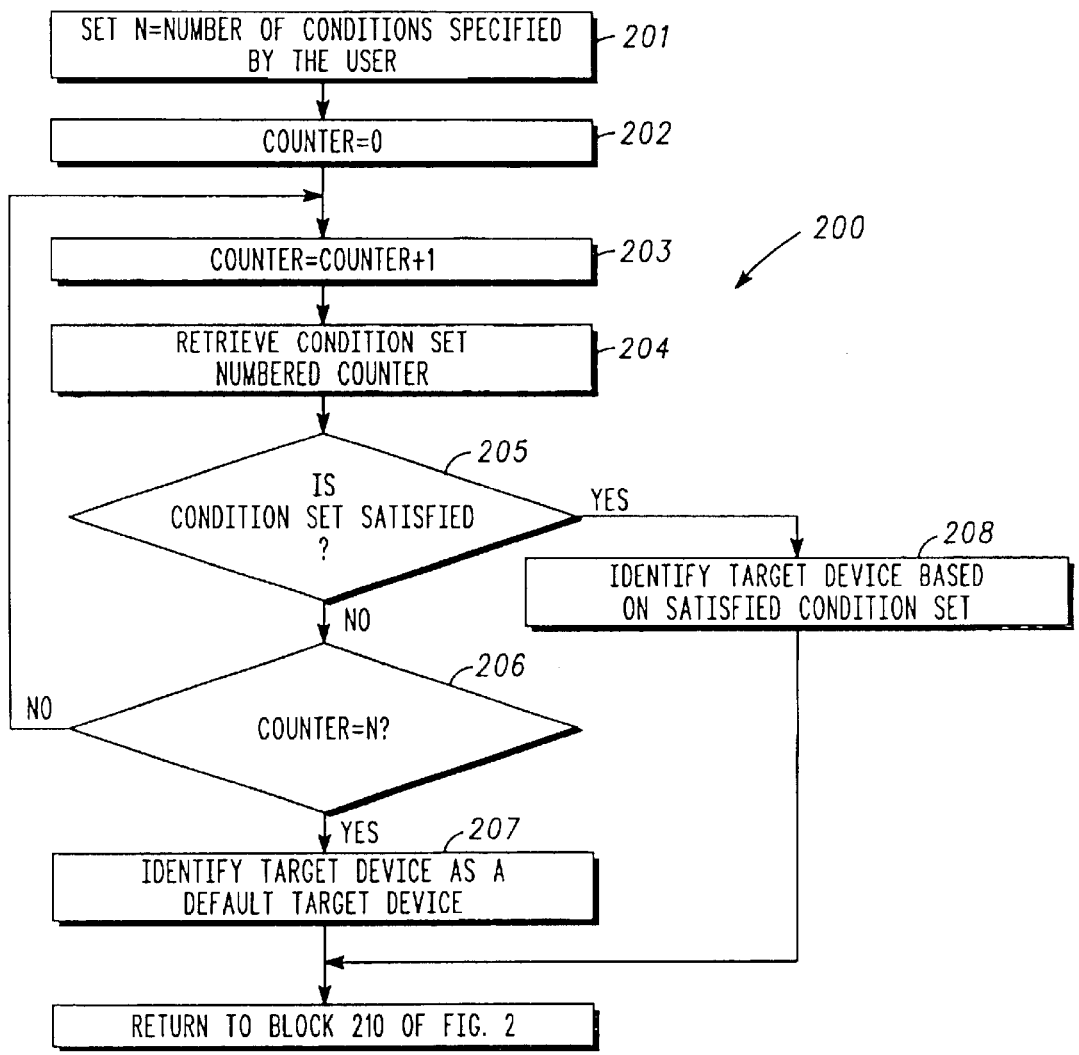
FIG. 3 is a flow chart that illustrates the steps of a location-based communication signal processing subroutine executed in conjunction with the steps of the flow chart of FIG. 2 in accordance with yet another aspect of the present invention.

Referring now to FIG. 3, the call filtering subroutine executed by the location call filtering center 36 at the block 200 of FIG. 2, begins at a block 201, wherein the location call filtering center 36 sets a variable denoted "N" to be equal to the number of conditions that have been specified by the user in the user location filter database 46. Next, at a block 202, the location call filtering center 36 sets a counter, denoted "COUNTER," equal to zero. Thereafter, control passes to a block 203 wherein the location call filtering center 36 increments the value of the counter by one such that "COUNTER=COUNTER+1." Next, at a block 204, the location call filtering center 36 retrieves the condition set that corresponds to the value of COUNTER such that, for example, if COUNTER is equal to one (1), then the first condition set is retrieved. Next, at a block 205, the location call filtering center 36 determines whether the condition set has been satisfied. For example, the first condition set may identify a first geographical region and a first candidate target communication device such that if the mobile subscriber unit 28 is located in the first geographical region then the call is to be forwarded to the first target communication device, i.e., "if the mobile subscriber unit is located in the first geographical region, then forward the call to a first target communication device." If the first condition is satisfied, control proceeds to the block 208 where the target communication device is identified as the first candidate target communication device and thereafter control proceeds to the blocks 210 and 220 (see FIG. 2) where the call is forwarded to the first target communication device. If, instead, the mobile subscriber unit 28 is not located in the first geographical region such that the first condition set is not satisfied, then control proceeds to a block 206 where the location call filtering center 36 compares the value of COUNTER to the value of N. If the value of COUNTER is equal to the value of N, then all of the condition sets specified by the subscriber in the user location filter database 46 have been tested and none have been satisfied such that control proceeds to a block 207 wherein the location call filtering center 36 identifies a default target communication device as the target communication device. Thereafter, control proceeds to the block 210 (see FIG. 2) and block subsequent thereto. If COUNTER does not equal N, then all of the test conditions specified by the user in the location filter database 46 have not been tested such that control returns to the block 203 where, as described hereinbefore, the value of COUNTER is incremented by one (1) such that "COUNTER=COUNTER+1." After the COUNTER has been incremented at the block 203, control again passes to the block 204 and blocks subsequent thereto, where the location call filtering center 36 obtains and tests the next condition set. Control continues to loop through the blocks 203–206 until one of the condition sets is satisfied such that one of the candidate target communication devices is identified as the target communication device to which the call is to be forwarded at which point control branches to the block 210 as described hereinbefore. Or, as previously stated, if instead, all of the condition sets have been tested but none have been satisfied, then control branches to the block 207 where the MSC 22 is prompted to forward the call to a default target communication device.

One having ordinary skill in the art will appreciate that in order for the steps performed at the blocks 201–206 to execute properly, the number of conditions in the condition set must not be equal to zero. Thus, it is assumed that each condition set has at least one condition to ensure the proper execution of the steps of blocks 201–206. Of course, if a condition set may exist wherein the number of conditions is equal to zero, then it will be necessary to alter the steps performed at the blocks 201–206 to prevent an error condition from occurring. For example, after the value of N is set to equal the number of conditions at the block 201, the value of N may be tested to determine whether N is equal to zero and, if so, control may continue at the block 207.

As described hereinbefore, in some instances; the geographical location of the primary communication device may not be determinable by the GMLC 34. In the event that this occurs, the GMLC 34 may be programmed to indicate to the location call filtering center 36 that the geographical location of the primary communication device is not available. Upon receipt of this information, the location call filtering center 36 may be programmed to inform the MSC 22 of the identity of a default target communication device. Alternatively, the location call filtering center 36 may be programmed to execute the call filtering subroutine at the block 200. Of course, if the call filtering subroutine is executed at the block 200 when the geographical location is not available, then the user location filter database 46 will have to have been modified to include a condition set that may be used in the event that the geographical location is not available. Such a condition set would be associated with a candidate target communication device such that if the geographical location of the mobile subscriber unit 28 is unavailable, then the call is to be forwarded to the candidate target communication device associated with condition set.

Certain modifications to the present invention may occur to one of ordinary skill in the art. For example, although the location call filtering center 36 and the GMLC 34 are shown in FIG. 1 as distinct entities, the location call filtering center 36 may instead be implemented using the hardware disposed in the GMLC 32. In addition, communication system 20 may be altered such that the operations necessary to effect location-based call filtering are performed at the subscriber unit 28. Of course to perform the location-based call processing at the subscriber unit 28, the subscriber unit 28 would have to be modified to include apparatus necessary to obtain the coordinates of the geographical location at which it is located. For example, a conventional subscriber unit, which typically includes a call processor and a memory associated with the call processor, may be modified to include a Global Positioning System ("GPS") receiver that operates in cooperation with a satellite communication system (not shown) to determine the coordinates of the geographical location at which the subscriber unit is located. Such GPS receivers and the methods by which they perform geographical location determination are well known in the art and, as a result, are not discussed further herein. In addition to including a GPS receiver in the subscriber unit 28, a set of conditions/preferences may be stored in the memory disposed in the subscriber unit and the call processor disposed in the subscriber unit 28 may be programmed to perform a call filtering subroutine that tests the set of conditions/preferences to determine the target communication device to which the call shall be forwarded and/or to determine which of a set of call processing operations are to be performed on the call. Of course, it will be understood by one having ordinary skill in the art that the storage capacity of the memory disposed in the subscriber unit 28 may have to be increased to enable the storage of the set of conditions/preferences in the memory.

In addition to modifying the subscriber unit, the method of the present invention may be altered to accommodate a communication system wherein the location-based call processing service is performed at the communication device such that a call received at the MSC 22 and addressed to the mobile subscriber unit 28 is forwarded to the subscriber unit 28 according to standard call forwarding procedures. Upon receiving the call, the subscriber unit 28 may proceed to determine the target device to which the call shall be forwarded based on the location of the mobile subscriber unit, and may then proceed to inform the MSC 22 that the call is to be forwarded to the identified target communication device.

Alternatively, the operations necessary to effect location-based call processing may be performed jointly by the subscriber unit 28 and by equipment associated with the infrastructure of the communication system 20 such as the MSC 22, the location call filtering center 36 and the GMLC 34. For example, the GMLC 34 may determine the location of the subscriber unit 28 and the MSC 22 may transfer this information to the subscriber unit 28. The processor disposed in the subscriber unit 28 may be programmed to then use the location information to identify the target device 31 to which the call shall be forwarded and to then inform the MSC 22 of the identity of the target device 31. Conversely, the subscriber unit 28, having a GPS receiver installed therein, may determine its own location and then forward this information to the location call filtering center 36 via the MSC 22 for use in identifying the target device to which the call is to be forwarded.

Further, the location-based call filtering service need not be automatically initiated upon placing a call but may instead be initiated by a caller responding to a prompt. For example, upon dialing a number associated with a subscriber unit 28 that is authorized to receive the location-based filtering service, the location call filtering center 36 may cause the MSC 22 to play a message that informs the caller that the location-based call filtering service is available and that the caller may opt to forward the call, or terminate the call, in the event that the party to be reached is positioned at a particular geographical location. For example, the message may inform the caller that the subscriber unit 28 that the caller is trying to reach is currently located at a work address and may then ask the caller if he would like to ring the subscriber unit 28 or if he would instead like to leave a voicemail message.

Moreover, because portable communication devices are not only associated with wireless communication systems but also with wired communication systems, the present invention may also be implemented in a wired communication system. For example, a communication device, such as a telephone with enhanced processing capabilities such as a smart phone, may be plugged into any number of outlets associated with a wired communication system wherein each outlet is located at a separate geographical location. Moreover, the smart phone and or a switching center associated with the wired communication system may be capable of determining the geographical location of the smart phone based on the outlet at which it is plugged in and this geographical location may then be used to determine which of a plurality of processing operations are to be performed on the communication signal(s) that are addressed to the smart phone or are otherwise associated with the smart phone.

In addition, the database in which the set of conditions/preferences are stored may instead be implemented with a lookup table having a list of candidate communication devices and a list of geographical regions wherein each of the geographical regions are associated with one of the candidate communication devices. The processor may then identify the geographical region in which the primary communication device is located and then identify the candidate communication device associated with the identified geographical region as the target communication device to which the call shall be forwarded.

Thus, while the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. An apparatus that communicates with a communication system, wherein the communication system processes a communication signal by performing any of a plurality of operations on the communication signal, the apparatus comprising;
   a processor that receives information regarding the availability of a geographical location of a primary communication device, wherein the information indicates whether the geographical location is available, and further wherein, if the information indicates that the geographical location is available, then the processor identifies one or more of the operations to be performed on the communication signal based on the geographical location of the primary communication device, and if the information indicates that the geographical location is not available, then the processor identifies one or more of the operations to be performed on the communication signal based on the information that the geographical location is not available.

2. The apparatus defined in claim 1, wherein the processor informs the communication system of the one or more identified operations.

3. The apparatus defined in claim 1, wherein the processor is adapted to process the communication signal by performing any of the plurality of operations on the communication signal and further wherein the processor performs the one or more identified operations.

4. The apparatus defined in claim 1, wherein at least one of the operations comprises forwarding the communication signal to a target communication device.

5. The apparatus defined in claim 4, wherein the target communication device is selected from the group consisting of a telephone, a voicemail program, a paging device, and a personal digital assistant.

6. The apparatus defined in claim 1, wherein at least one of the operations comprises forwarding the communication signal to one of a plurality of candidate communication devices.

7. The apparatus of claim 6, further comprising a memory coupled to the processor, wherein the processor identifies one of the plurality of candidate communication devices as a target communication device to which the call shall be forwarded further based on information stored in the memory.

8. The apparatus defined in claim 7, wherein the information stored in the memory comprises a database, wherein the database comprises a list of the candidate communication devices and a list of one or more geographical regions, wherein each of the geographical regions is associated with one of the candidate communication devices, and further wherein the processor compares the geographical location of the primary communication device to the list of geographical regions to determine in which of the geographical regions the primary communication device is located, and further wherein the processor identifies the candidate communication device associated with the geographical region within which the primary communication device is located as the target communication device to which the communication signal is to be forwarded.

9. The apparatus defined in claim 7, wherein the information stored in the memory comprises a set of conditions that are associated with one of the candidate communication device and wherein the processor tests each of the conditions such that if all of the conditions are satisfied, then the processor identifies the candidate communication device associated with the set of conditions as the target communication device to which the communication signal is to be forwarded.

10. The apparatus of claim 7, wherein the processor comprises a first processor, and wherein the apparatus further comprises a communication network coupled to the first processor and further coupled to a plurality of second processors, wherein at least one of the second processors may be used to enter the information into the memory and further wherein at least one of the second processors may be used to edit the information stored in the memory.

11. The apparatus defined in claim 1, wherein the one or more operations to be performed on the communication signal further depends on a time at which the communication signal is processed by the communication system.

12. The apparatus defined in claim 1, wherein the one or more operations to be performed on the communication signal further depends on a rate of speed at which the primary communication device is traveling when the communication signal is processed by the communication system.

13. The apparatus defined in claim 1, wherein the communication signal includes an identification code that identifies a source from which the communication signal originated and further wherein the one or more operations to be performed on the communication signal further depends on the identification code.

14. The apparatus defined in claim 1, wherein the processor is disposed in a communication device.

15. The apparatus defined in claim 14, wherein a location determining apparatus that determines the location of the primary communication device is disposed in the communication device.

16. The apparatus defined in claim 14, wherein the communication system comprises a switching center and wherein a location determining apparatus that determines the location of the primary communication device is disposed in a mobile geographical location center that is coupled to the switching center and wherein the location determining apparatus informs the communication system of the geographical location of the primary communication device and wherein the switching center communicates the geographical location of the primary communication device to the processor disposed in the communication device.

17. The apparatus defined in claim 1, wherein the communication system comprises a switching center and wherein the processor is disposed in a location call filtering center that is coupled to the switching center.

18. The apparatus defined in claim 17, wherein a location determining apparatus that determines the location of the primary communication device is disposed in the primary communication device, and wherein the location determining apparatus informs the communication system of the geographical location of the primary communication device and further wherein the communication system informs the processor of the geographical location of the primary communication device.

19. The apparatus defined in claim 1, wherein the communication system is a circuit mode communication system.

20. The apparatus defined in claim 1, wherein the communication system is a packet-switched mode communication system and wherein the communication signal is packet-switched communication signal.

21. The apparatus defined in claim 1, wherein the communication signal is selected from the group consisting of a video signal, a voice signal, and a binary data signal.

22. The apparatus of claim 1, wherein the communication system comprises a telephone communication system and wherein the communication signal comprises a telephone call.

23. The apparatus defined in claim 1, wherein the primary communication device is selected from the group consisting of a telephone, a paging device, and a personal digital assistant.

24. An apparatus that communicates with a telephone communication system for processing a telephone call, wherein the processing performed by the telephone communication system comprises forwarding the telephone call, the apparatus comprising:
   a processor, in a wireless communication system, that receives information comprising a geographical location at which a primary communication device is located and that identifies a target communication device to which the call shall be forwarded based on the geographical location of the primary communication device;
   a gateway mobile location center, in the wireless communication system and coupled to the processor, wherein the gateway mobile location center determines the geographical location of the primary communication device and delivers the geographical location to the processor and wherein the gateway mobile location center identifies the location of mobile subscriber units within the wireless communication system;
   a memory coupled to the processor wherein data is stored, wherein the data comprises a list of one or more candidate communication devices,
   wherein the data further comprises a list of one or more geographical regions,
   wherein each of the geographical regions is associated with one of the candidate communication devices,
   wherein the processor compares the geographical location of the primary communication device to the one or more geographical regions in the memory to determine in which of the one or more geographical regions the primary communication device is located,
   wherein the processor identifies the candidate communication device associated with the geographical region within which the primary communication device is located as the target communication device to which the call shall be forwarded,
   wherein the processor comprises a first processor, and wherein the apparatus further comprises a communication network coupled to the first processor, and
   wherein the communication network is further coupled to a plurality of second processors, and at least one of the second processors may be used to enter the data into the memory and to edit the data stored in the memory.

25. The apparatus as defined in claim 24, wherein the communication network comprises the Internet and wherein the plurality of second processors are capable of communicating with the first processor via the Internet.

26. The apparatus as defined in claim 25, wherein the first processor is adapted to operate as an Internet server that supports an Internet web page.

27. The apparatus as defined in claim 26, wherein the Internet web page comprises a set of data fields into which the data may be entered.

28. The apparatus as defined in claim 27, wherein the Internet web page comprises a geographical map, and wherein the portions of the geographical map may be highlighted to define the boundaries of one or more of the geographical regions for subsequent storage in the memory.

29. The apparatus as defined in claim 24, wherein the at least one of the second processors that may be used to enter the data into the memory and to edit the data stored in the memory is disposed in a communication device.

30. The apparatus defined in claim 24, wherein the telephone communication system comprises a switching center and wherein the apparatus is disposed in a location call filtering center that is coupled to the switching center.

31. The apparatus defined in claim 24, wherein the processor and the memory are disposed in a communication device.

32. The apparatus defined in claim 31, further comprising a geographical location determining apparatus disposed in the communication device, wherein the geographical location determining apparatus determines the location of the primary communication device.

33. The apparatus as defined in claim 24, wherein the primary communication device is selected from the group consisting of a telephone, and a paging device.

34. The apparatus as defined in claim 24, wherein the target communication device is selected from a group consisting of a paging device and a voicemail program.

35. The apparatus as defined in claim 24, wherein the data entered comprises a set of preferences, and further wherein the processor uses the set of preferences in conjunction with the geographical location of the primary communication device to identify the target communication device.

36. A method for processing a communication signal, wherein the communication signal is processed by performing any of a plurality of operations on the communication signal, the method comprising the steps of:
   a) receiving information regarding the availability of a geographical location of a primary communication device, wherein the information indicates whether the geographical location is available; and
   b) if the information indicates that the geographical location is available, then identifying one or more of the operations to be performed on the communication signal based on the geographical location of the primary communication device; and
   c) if the information indicates that the geographical location is not available, then identifying one or more of the operations to be performed on the communication signal based on the information that the geographical location is not available.

37. The method as defined in claim 36, wherein the communication signal comprises a telephone signal.

38. The method as defined in claim 36, wherein the at least one of the plurality of operations comprises forwarding the communication signal to one of a plurality of candidate communication devices.

39. The method as defined in claim 38, wherein at least one of the candidate communication devices comprises a telephone and wherein the primary communication device comprises a telephone.

40. The method of claim 36, further comprising the step of querying a geographical location determining apparatus that determines the geographical location of the primary communication device, wherein the step of querying is performed before step a).

41. The method of claim 36, wherein the steps b) and c) further comprise the step of accessing a memory in which data is stored, wherein the data includes a list of geographical regions and further includes a list of candidate operations, wherein each of the geographical regions are associated with one of the candidate operations, and wherein the geographical region in which the primary communication device is located is determined, and further wherein the operation to be performed on the communication signal is identified as the candidate operation associated with the geographical region in which the primary communication device is located.

42. The method of claim 36, wherein the communication signal comprises information that identifies a subscriber and wherein the method further comprises a step of determining whether the subscriber identified in the communication signal is authorized, such that if the subscriber is authorized, then the steps of a), b) and c) are performed, and if the subscriber is not authorized, then the steps of a), b) and c) are not performed.

43. The method of claim 36, further comprising a step d) of providing the identity of the operation to be performed to a communication system so that the communication system may perform the identified operation on the communication signal, wherein the step d) is performed after the step c).

44. The method of claim 36, further comprising the steps of 1) querying a geographical location determining apparatus that determines the availability of the geographical location of the primary communication device, and 2) if the geographical location is available, then determining the geographical location of the primary communication device wherein the steps of 1) and 2) are performed before the steps of a), b) and c).

45. The method of claim 44, wherein the steps of 1) and a) and b) and c) are performed by a processor disposed in a communication device that communicates with a communication system and wherein the step 2) is performed by a processor that is disposed in a geographical mobile location center that is coupled to the communication system.

46. The method of claim 44, wherein the steps of 1) and a) and b) and c) are performed by a processor that is disposed in a location call filtering center that is coupled to a communication system, and wherein the step 2) is performed by a processor disposed in a communication device that communicates with the communication system.

* * * * *